Jan. 26, 1932.  W. LISTER  1,842,910

PISTON

Original Filed April 5, 1928

Fig. II

Inventor:
William Lister

Patented Jan. 26, 1932

1,842,910

UNITED STATES PATENT OFFICE

WILLIAM LISTER, OF PINE HAVEN BEACH, MINNESOTA

PISTON

Application filed April 5, 1928, Serial No. 267,582. Renewed June 16, 1931.

My invention is concerned with pistons of the type used in gas engines, and is designed to improve on those now in general use in two particulars: (1) by constructing the same so that by removing the cylinder head, the piston can be readily removed from the cylinder for any desired purpose, such, for instance, as replacing the piston rings; (2) by constructing the same so that no piston rings are required to keep the pistons tight as they are worn down with use.

To illustrate my invention, I annex hereto a sheet of drawings, in which the same reference characters are used to designate identical parts in all the figures, of which,—

Fig. 4 is a vertical section showing a modification.

Figure 1:
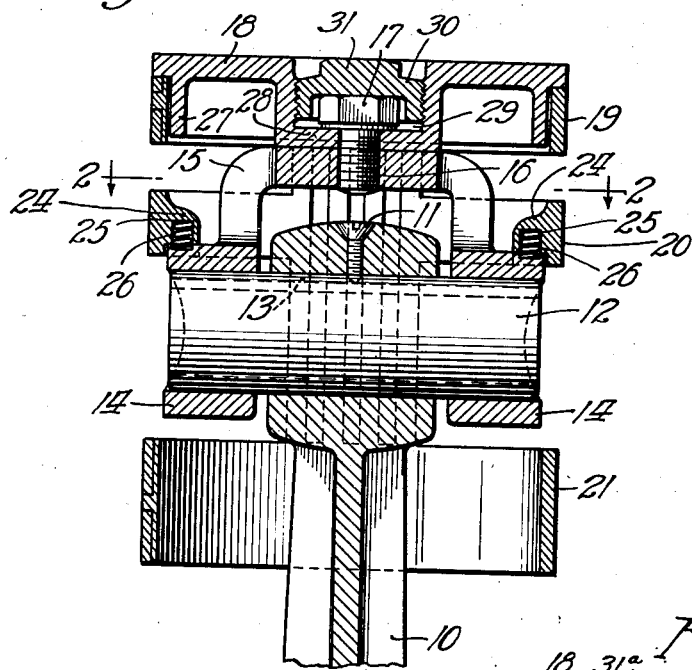
Fig. 1 is a vertical section on the line 1—1 of Fig. 2.
Figure 1:
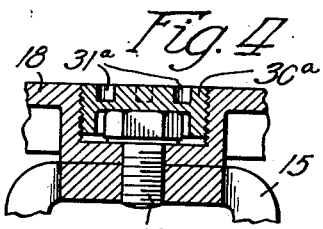

In carrying out the first feature of my invention I may construct my piston as follows:

The connecting rod 10 has secured in the end thereof, by the set screw 11 threaded therein, the wrist pin 12 preferably containing the longitudinal groove 13 in its periphery, with which the end of the screw 11 co-operates. The ends of the wrist pin 12 are journaled in the annular bearings 14 forming the ends of the yoke 15 having the threaded aperture 16 in its center, into which is screwed the machine screw 17 passed through the aperture in the center of the piston cap 18 to hold the latter securely in its place on the yoke 15. While for the purposes of the first feature of my invention the piston body might be a continuous cylinder with the customary annular grooves to receive the customary piston rings, I have (to embody both features of my invention in a single structure) shown it as composed of the three split-ring portions 19, 20 and 21 connected by the two diametrically opposed vertical webs 22, which are preferably lightened and made more elastic by the series of longitudinal slots 23 formed therein. To support the piston body nonrotatably on the yoke 15, I form in the interior of the ring 20 a pair of lugs 24 which have their bottom surfaces concaved so as to fit snugly on the adjacent convex surfaces of the bearings 14 so as to prevent the piston body turning relative to the yoke 15.

I may bore holes 25 in the lugs 24 to receive the helically-coiled expanding springs 26 which serve to press the top of the piston body into closer engagement with the piston cap 18, which preferably has the annular flange 27 extending into the piston body, as shown. The central boss 28 of the piston cap contains the threaded aperture 29, which lightens it and also serves to contain the hexagonal end of the machine screw 17, which is locked in place by the externally threaded cap 30 having the hexagonal boss 31, to which a wrench is applied in screwing it down into the aperture 29, as shown.

The operation of the piston as thus far described will be readily apparent. When it is desired to remove it, all that is necessary is to remove the cylinder head, when a wrench can be applied to the hexagonal boss 31 to screw the cap 30 out of the aperture 29, after which the same wrench can be used to remove the machine screw 17, after which the cap 18 can be removed, being thus freed from the yoke 15. By catching the tool under the bottom of the ring portion 19, the piston body can then be pulled out of the cylinder for any needed treatment.

In Fig. 4, I have illustrated another form of a cap 30ª having the recesses 31ª to co-operate with a wrench instead of the hexagonal boss 31.

Figure 2:
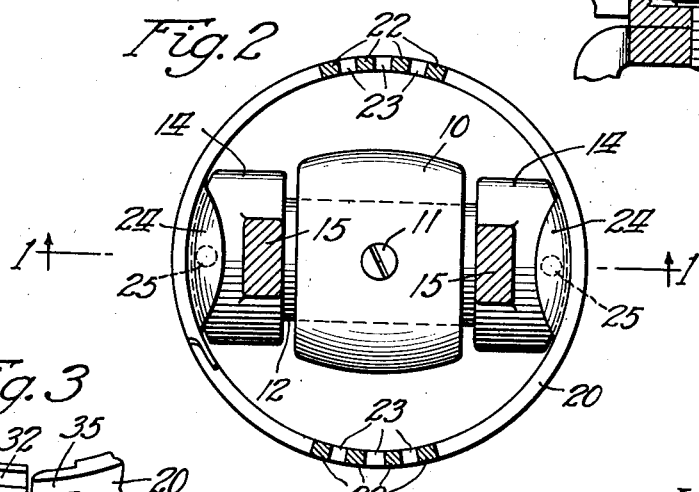
Fig. 2 is a horizontal section on the line 2—2 of Fig. 1.
Figure 3:
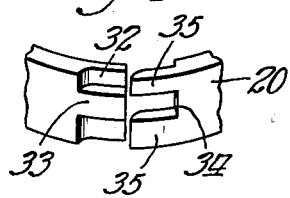
Fig. 3 is a perspective of a portion of the piston body.

The second feature of my invention resides in the dividing of the piston body into the split-ring portions 19, 20 and 21 connected by the web or webs 22, so that these portions themselves act as piston rings. The details of the split in each ring are best shown in the perspective view, which shows the split in the ring portion 20. One end of the ring after it is severed has the recesses 32 milled therein, leaving the tongue or rib 33 between them to co-operate with the slot or groove 34 milled in the other end, which also has its inner face milled off to leave two tongues 35 which are complementary in shape to the recesses 32, which they enter and fill when the ring is contracted to the greatest possible extent, as seen in Fig. 2. The tongue 33 and slot 34 are centrally located in the ring portions 20 and 21, but are toward the upper edge and relatively narrow in the ring portion 19, as compared with the same parts in the ring portion 20, where the tongue and slot are substantially as wide as each of the tongues 35. The ring portions 19 and 21 are split half way between the webs 22, and the ring portion 20 is split adjacent the lug 24, which prevents it from being split at the most desirable location, i. e., half way between the webs 22. It will be understood that the same principle would be involved if the ring portions 19, 20 and 21, or either of them, were split in two places, half way between the webs 22, instead of the single place shown.

The operation of this split-ring piston will be readily apparent. When the piston is new and in place, the portions 19, 20 and 21 will be compressed to the extent necessary to enter the cylinder, as indicated in Fig. 2. As wear occurs, they are free to expand until they are worn down to where they fail to overlap, when, of course, the piston body will have to be renewed.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a piston of the class described, the combination with a connecting rod, of a bearing yoke in which only it is journaled, a piston body held on the yoke separate therefrom but to prevent its rotation, a piston cap closing the end of the piston body, and a screw passed through an aperture in the cap and threaded into the yoke to detachably hold a portion of the piston body clamped between the yoke and the piston cap, so that the piston can be removed without disconnecting the yoke and connecting rod.

2. In a piston of the class described, the combination with a connecting rod, of a bearing yoke in which only it is journaled, a piston held from turning on the yoke by inwardly projecting lugs having their bottom surfaces concaved to fit on the ends of the yoke bearings, and means for detachably securing the piston clamped on the yoke, so that the piston can be removed without disconnecting the yoke and connecting rod.

3. In a piston of the class described, the combination with a connecting rod, of a bearing yoke in which it is journaled, a piston body held on the yoke to prevent its rotation by inwardly projecting lugs having their bottom surfaces concaved to fit on the ends of the yoke bearings, a piston cap closing the end of the piston body, and a screw passed through an aperture in the cap and threaded into the yoke to detachably hold a portion of the piston body between the yoke and the piston cap, said lugs having recesses in said concaved surfaces to receive helically-coiled expanding springs placed therein and acting to press the top of the piston body against the piston cap.

4. In a piston of the class described, the combination with a connecting rod, of a bearing yoke in which it is journaled, a piston body held from turning on the yoke by inwardly projecting lugs having their bottom surfaces concaved to fit on the ends of the yoke bearings, said lugs having recesses in said concaved surfaces, helically-coiled expanding springs placed in said recesses and acting to press the top of the piston body away from the bearing yoke, a piston cap closing the end of the piston body, a screw placed in an interiorly threaded recess formed in the end of the cap and passing through an unthreaded aperture in the bottom of the recess and threaded into the yoke, and a second cap screwed into the top of the interiorly threaded recess.

5. A piston having the cylindrical wall thereof formed of a plurality of split elastic rings with their ends overlapped when placed in the cylinder and connected by web portions which are slotted longitudinally of the length of the piston.

6. A piston having the cylindrical wall thereof formed by three split elastic rings formed integral with a pair of webs connecting said rings, which rings have their ends overlapped when the piston is in the cylinder.

7. A piston having the cylindrical wall thereof formed by three split elastic rings formed integral with a pair of webs connecting said rings, which rings have their ends overlapped when the piston is in the cylinder, in combination with a yoke having its bearing ends co-operating with inwardly projecting lugs on one of the rings, said lugs having concaved bottoms engaged by the bearing ends of the yoke to prevent their relative movement, a piston cap, and a retaining screw passed through the cap and threaded into the yoke to secure the parts detachably together.

8. A piston having the cylindrical wall thereof formed by three split elastic rings formed integral with a pair of webs connecting said rings, which rings have their ends overlapped when the piston is in the cylinder, in combination with a yoke having its bearing ends co-operating with inwardly projecting lugs on one of the rings, said lugs having concaved ends engaged by the bearing ends of the yoke to prevent their relative movement, a piston cap, and a retaining screw passed through the cap and threaded into the yoke to secure the parts detachably together, said cap having an inwardly projecting annular flange just inside the adjacent split ring.

9. A piston having its cylindrical wall formed only of a plurality of split elastic rings connected only by narrow web portions integral therewith and extending along the axis of the cylinder and with their ends overlapped when placed in the cylinder.

In witness whereof, I have hereunto set my hand this 2nd day of April, 1928.

WILLIAM LISTER.